United States Patent
Praeg

[11] 4,054,933
[45] Oct. 18, 1977

[54] SATURATING TIME-DELAY TRANSFORMER FOR OVERCURRENT PROTECTION

[75] Inventor: Walter F. Praeg, Palos Park, Ill.

[73] Assignee: The United States of America as represented by the United States Energy Research and Development Administration, Washington, D.C.

[21] Appl. No.: 642,045

[22] Filed: Dec. 18, 1975

[51] Int. Cl.² .............................................. H02H 3/08
[52] U.S. Cl. .......................................... 361/57; 361/94
[58] Field of Search ................. 317/20, 16, 17, 335 C, 317/49, 53; 307/88 R; 323/6, 44 R, 45, 56

[56] References Cited
U.S. PATENT DOCUMENTS

| | | | |
|---|---|---|---|
| 2,571,027 | 10/1951 | Garner | 317/16 X |
| 2,910,626 | 10/1959 | Koros | 317/20 X |
| 2,928,956 | 3/1960 | Jones | 317/16 |
| 2,949,568 | 8/1960 | Dortort | 317/20 X |
| 2,971,130 | 2/1961 | Diebold | 317/20 X |
| 3,267,331 | 8/1966 | Melhart | 317/16 X |
| 3,671,810 | 6/1972 | Barnes et al. | 317/20 |
| 3,867,669 | 2/1975 | Krasik et al. | 317/16 |
| 3,936,702 | 2/1976 | Plasko | 317/16 X |

*Primary Examiner*—J D Miller
*Assistant Examiner*—Patrick R. Salce
*Attorney, Agent, or Firm*—Dean F. Carlson; Frank H. Jackson; Donald P. Reynolds

[57] ABSTRACT

Electrical loads connected to d-c supplies are protected from damage by overcurrent in the case of a load fault by connecting in series with the load a saturating transformer that detects a load fault and limits the fault current to a safe level for a period long enough to correct the fault or else disconnect the power supply.

9 Claims, 4 Drawing Figures

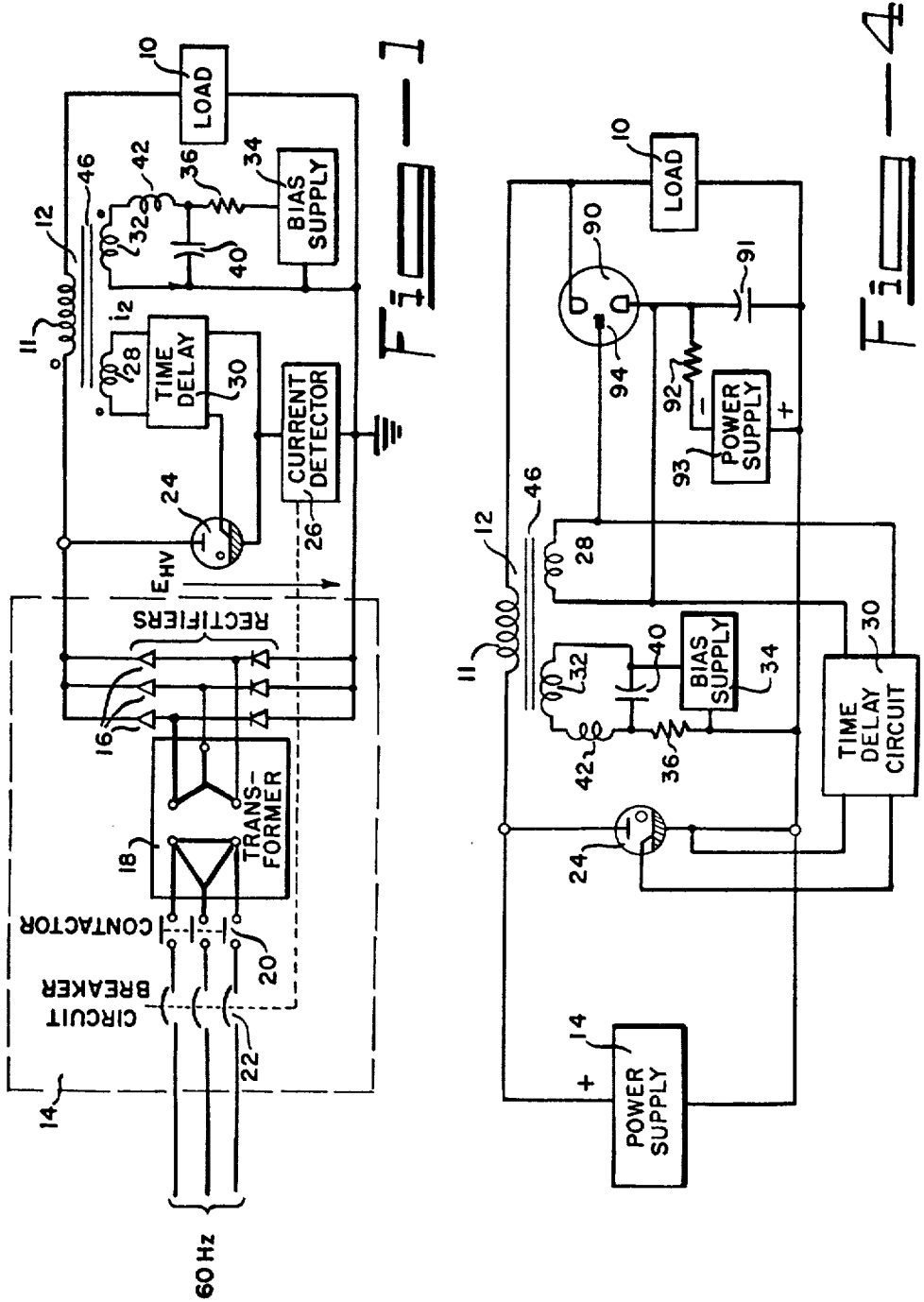

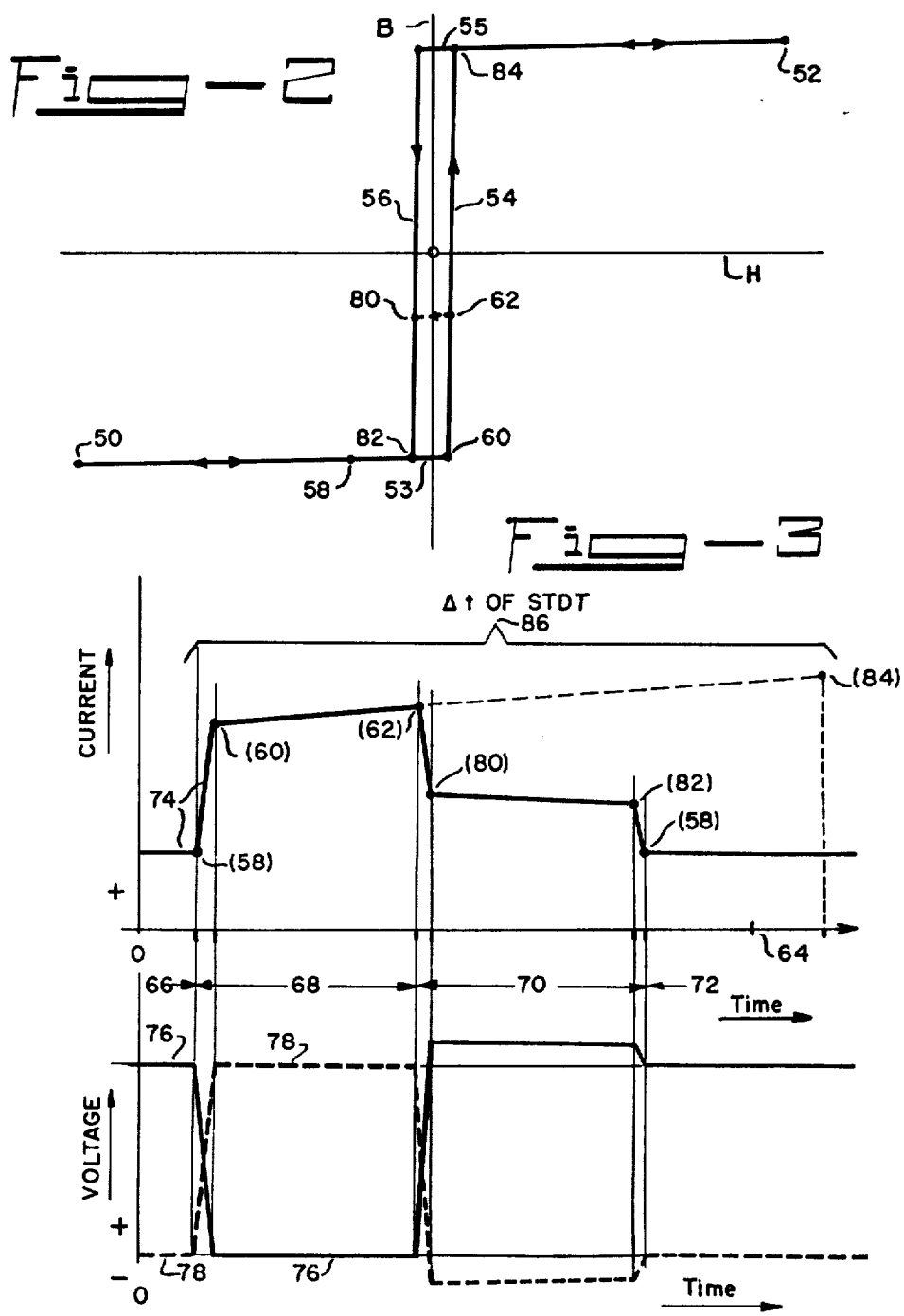

`4,054,933`

SATURATING TIME-DELAY TRANSFORMER FOR OVERCURRENT PROTECTION

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

This invention relates to the protection of d-c electrical loads from damaging overcurrent. In particular it applies to circuits where a breakdown of insulation in the load causes a sudden large increase in current. Such an increase is characteristic of a fault in a high-voltage tube or a high-voltage accelerating structure.

Electrical loads that are connected to high-voltage d-c power supplies are frequently subject to a risk of destruction by delivery of some of the power from the supply to portions of the load in excessive quantities as a result of a fault. This is especially true of high-voltage accelerating structures connected to high-voltage power supplies, although almost any load that is connected to a d-c power supply is capable of being damaged, at least locally, by fault currents. However, the threat of electrical breakdown is greatest in those electrical loads that are connected to power supplies at relatively high voltage, of the order of kilovolts. It is customary to protect such loads from damage by the use of a crowbar. This is a controllable short circuit that can be placed across the output terminals of the power supply to short out the load and thereby bypass the electrical energy that would otherwise be delivered in an excessive amount to the load. The crowbar is often a gas tube such as an ignitron, a solid-state device such as a silicon-controlled rectifier (SCR), or a triggered spark gap. A control signal for the crowbar is derived from a sensor of load current, load voltage or both, and the presence of a damaging fault is caused to generate a signal that operates the crowbar. With the output of the supply shorted, the load is relieved of the excess electrical energy that would otherwise have been delivered to it and the overcurrent protective mechanisms normally built into the circuit will trip to prevent damage to the power supply.

The arrangement just described has one major disadvantage. This is the fact that the signal required to operate the crowbar results from the application of damaging currents to the load. It frequently happens that the load is damaged before the crowbar can be applied. Even in circumstances when the load is not immediately damaged by the excessive current, it remains true that the load is caused to carry current beyond its normal operating range in order to trip the crowbar. A fault current that may be as much as several orders of magnitude larger than normal load currents thus passes for a period of time through the load. It would clearly be desirable to have a protective mechanism whose operation did not require damaging currents.

It is an object of the present invention to provide a better means of protecting d-c electrical loads from damage due to overcurrents.

It is a further object of the present invention to provide a means of overcurrent protection for d-c electrical loads that does not require the passage of damaging currents through the load to operate the protection.

Other objects will become apparent in the course of a detailed description of the invention.

SUMMARY OF THE INVENTION

A d-c electrical load is protected from damage due to overcurrent by an apparatus comprising a saturating transformer that has a primary winding connected in series with the load. A second winding carries a bias current which magnetizes in opposition to the primary current and which, together with the load current, established in the core of the transformer a net flux level that is in saturation but near the knee of the B-H curve. A load fault causes the primary current to increase to a value that brings the core out of saturation, thereby generating an opposing emf that limits the current increase. When the core comes out of saturation a signal is generated that can be used to trigger a crowbar to disconnect the circuit from the power supply. This signal may be taken from the second winding or from a third winding added for this purpose. A crowbar time delay may be interposed between the sensing winding and the crowbar to delay operation of the crowbar and thus avoid the interruption of service from unsustained arcs. The triggering winding may also operate a spark gap placed in series with a charged capacitor that is discharged through the load to clear the fault and restore normal operation of the circuit.

BRIEF DESCRIPTION OF THE DRAWINGS

FIG. 1 is a circuit diagram of an apparatus for the practice of the present invention.

FIG. 2 is a typical hysteresis or B-H curve for the core of the transformer of the present invention.

FIG. 3 is a time plot of currents and voltages in the circuit of FIG. 1.

FIG. 4 is a circuit diagram of an alternate embodiment of the present invention.

DETAILED DESCRIPTION OF THE INVENTION

FIG. 1 is a circuit diagram of an apparatus for the practice of the present invention. In FIG. 1, load 10 is an electrical load that is subject to damage in the event of a fault in the load. Examples of such electrical loads include high-voltage accelerating structures and high-voltage vacuum tubes. Load 10 is connected to form a series circuit with primary winding 11 of transformer 12 and d-c power supply 14. Bridge rectifiers 16 and three-phase transformer 18 are connected through contactor 20 and circuit breaker 22 to an a-c power line to comprise d-c power supply 14. A crowbar 24 is connected across the terminals of power supply 14 to apply a short circuit across power supply 14 and thereby afford protection to load 10. Current detector 26 is placed in series with crowbar 24 to provide a signal to trip circuit breaker 22 to disconnect the a-c power line from transformer 18 and thereby protect power supply 14 against damage. Alternatively, circuit breaker 22 may trip normally under the influence of an overcurrent through circuit breaker 22.

Circuits such as that of FIG. 1 in which a power supply 14 supplies a load 10 with a crowbar 24 placed to protect load 10 are well known in the art. The crowbar 24 is typically triggered either by sensing a drop in the voltage across load 10 or an increase in the current through load 10. Each of these means of triggering requires that load 10 carry a current that is substantially beyond its normal operating current in order to trigger crowbar 24. The present invention avoids that disadvantage as follows. Transformer 12 of the present invention includes a winding 28 that generates an input to a time-delay circuit 30 to trigger crowbar 24. Transformer 12 also generates a back emf that opposes the increase in load current that would otherwise result from a fault in load 10. The point of operation is set by the current in bias winding 32. This is a d-c current that is supplied by bias supply 34 through resistor 36. The combination of capacitor 40 and inductor 42 forms a filter to isolate bias supply 34 from pulses generated in bias winding 32 by changes in load current through transformer 12. In transformer 12 primary winding 11 must be sized to carry load current and also insulated sufficiently to withstand the voltages applied to load 10. Core 46 of transformer 12 sustains the flux that establishes magnetic coupling among primary winding 11, winding 28 and bias winding 32.

Understanding of the operation of the present invention will be aided by reference to FIG. 2 which is an idealized version of a B-H curve of the core 46 of transformer 12 of FIG. 1. FIG. 2 is idealized for ease of drawing and reference, but the idealization of the characteristics is not significant to the description of the invention. The curve of FIG. 2 is the major hysteresis loop for the material. It is the curve of magnetic flux density B as a function of magnetizing force H, also called the B-H curve. This curve is obtained by cycling the magnetizing force on a closed loop of the material in an amount sufficient to cause the material to go into saturation alternately in the positive and negative directions. This is indicated in FIG. 2 by the cycling between point 50 and point 52. The meaning of the term "major hysteresis loop" is that the application of larger amounts of magnetizing force in either direction will not change the curve on which the material returns when the magnetizing force is reduced. This is in contrast to the minor hysteresis loops which are obtained by cycling the magnetizing force at values that place the state of the material inside the area bounded by curves 53, 54, 55, and 56. Curves 54 and 56 are shown as straight and slightly sloped vertical lines. The presence of an air gap in the core would give curves 54 and 56 a finite value of slope, equal for both, and would facilitate manufacture of the transformer 12 of FIG. 1, but would not otherwise affect this invention. The invention is practiced by adjusting the voltage of bias supply 34 of FIG. 1 or the resistance of resistor 36 of FIG. 1 to set current $i2$ at a value that produces in core 46 of FIG. 1 a state of saturation at point 50 of FIG. 2. This saturation is then reduced to point 58 by the passage of load current through primary winding 11 of FIG. 1. The result of the two opposing effects in core 46 is to place point 58 in saturation but close to the knee of the curve of FIG. 2 which is indicated by point 60. The sharpness of the knee at point 60 is a function of the particular material of which core 46 is made, and is also a function of the scale to which the curve of FIG. 2 is drawn. However, saturation in the curve of FIG. 2 is unambiguous and it is necessary that point 58 be in the region of saturation of the core. It follows from inspection of FIG. 2 that, with the current $i2$ in bias winding 32 held constant, variations in the load current through primary winding 11 will cause corresponding motion of point 58 along the curve. Because point 58 is in a region of saturation, these changes in location cause essentially no change in magnetic flux in core 46 and hence no induced emf across primary winding 11. However, if the current through primary winding 11 increases sufficiently to cause the net magnetic flux in the core to pass point 60 and start up curve 54, then the transformer enters a region in which B, and hence the magnetic flux, is changing. This change of magnetic flux in a given period of time will generate an emf in primary winding 11 which will oppose the direction of current increase according to Lenz's law. The opposition takes the form of an emf $e = -n \, d(\text{phi})/dt$ that appears across primary winding 11 in a sense to subtract from or oppose the power supply voltage. This opposing emf will protect load 10 of FIG. 1 by keeping the load current at a value that will place the core in some portion of curve 54 for a time equal to that needed to move the length of curve 54. Point 62 is one such point. At the same time, the increase in flux linkages that was associated with the development of the back emf across primary winding 11 will also generate a voltage across signal winding 28 that can be used either directly or through a time delay such as time-delay circuit 30 to trigger crowbar 24. This triggering has thus taken place without the necessity for a damaging overcurrent in load 10 of FIG. 1.

FIG. 3 is a time plot of currents and voltages in the circuit of FIG. 1. The time scale of FIG. 3 is a function of the values of voltages, currents and the load in the circuit, but marker 64 is placed to show the time of 50 to 100 microseconds that is typical of a wide range of applications. Four time intervals are shown in FIG. 3, characterized as follows. Interval 66 is a period of normal operation. Interval 68 is a period of time during which an undesired arc exists in load 10 of FIG. 1. Interval 70 is a time period in which the arc has gone out and the circuit is returning to the normal operating condition. Interval 72 is a period of normal currents and voltages again. These intervals and the values of current and voltage associated with them are best understood by referring to the corresponding points on FIG. 2 as follows. During interval 66, current curve 74 is at a constant value representing the normal load current. Load voltage curve 76 is at a constant value which differs from the source voltage only by the small amount of the amplitude of d-c voltage drop of transformer voltage curve 78. Associated with these values of load current and load voltage is an operating point 58 on the B-H curve of FIG. 2, marked in parentheses on FIG. 3. Interval 66 ends when a short circuit develops in load 10 of FIG. 1. The load current immediately begins a rapid rise which is associated with a motion of the operating point in FIG. 2 from point 58 to point 60. During this change, the flux in core 46 is hardly changing. Therefore, the supply voltage is divided between the voltage drop across the transformer leakage inductance and that across the arc. As soon as the load current has reached point 60 of FIG. 2, at a value shown in parentheses in FIG. 3, the core enters the steeply rising portion of the hysteresis loop, curve 54. This portion is characterized by a high magnetizing inductance. Point 60 of FIG. 2 is known as the knee of the hysteresis loop. Past point 60, the steeply rising portion, curve 54, is associated in FIG. 3 with a relatively constant portion of the curve for load current 74, an abrupt rise in the curve of transformer voltage 78 and a correspondingly abrupt drop in load voltage curve 76. Once the knee of the B-H curve is turned, transformer winding 11 behaves like an inductor and the flux change in the core causes essentially all of the load voltage to appear across the primary of transformer 12. In some cases, this abrupt drop in the arc voltage together with the limit imposed by transformer 12 on the maximum value of load current will cause the fault to extinguish itself. The curves of FIG. 3 are drawn under the assumption that this has happened at the end of interval 68. The time at the end of interval 68 is associated in FIG. 2 with point 62 on the B-H curve, as indicated in parentheses in FIG. 3. It can be seen that point 62 in FIG. 2 is on the rising portion of the hysteresis curve.

Restoration of normal operating conditions begins with a drop in the load current and occurs in three stages. The first stage is an abrupt drop in a short interval that is associated in FIG. 2 with rapid passage along a minor hysteresis loop to point 80 on the B-H curve or major hysteresis loop of the material. Next the current is nearly constant, showing only a slight decrease, while the core is taken from point 80 to point 82. This corresponds to interval 70 in FIG. 3, in which the values corresponding to points 80 and 82 are shown in parentheses. Finally, on passing again into the region of saturation past point 82, the current drops abruptly to its normal operating level as the core returns to point 58. This is interval 72 in FIG. 3. Transformer voltage curve 78 is readily derivable from FIG. 2 by associating the changes with each interval. Thus, during interval 66, the voltage across transformer 12 is constant at the low value, nearly zero, representing the IR drop across the transformer. A change in the conditions of the circuit that cause the operating point of the core to move at the saturation level represents very little change in the voltage across the primary transformer 12, since the flux is changing very little in saturation, and the voltage is proportional to the time rate of change of magnetic flux. However, when the condition of the core is past point 60 and is in region 54 of FIG. 2, then the current, which is proportional to H, is changing very slightly while the flux, which is proportional to B, is changing rapidly. Thus, the transformer voltage achieves a high value and, in general, will drop almost all of the supply voltage. The passage in FIG. 2 from point 62 to 58 represents a return of stored magnetic energy from core 46 of transformer 12 so that the voltage across primary winding 12 becomes negative during this interval. Once this energy has been returned, allowing return of the core to point 58, the voltage across primary winding 44 of transformer 12 drops again to the low value representing the IR drop across the transformer.

The sloping lines in all the curves of FIG. 3 represent straight-line approximations to curves that are essentially exponentials with L/R time constants that are long compared to the time scale shown. The exact shape of these curves is less important than their relative magnitude and direction of increase or decrease and they are therefore idealized as straight lines. However, one thing should be noted from a comparison of the curves of FIGS. 2 and 3: the apparatus of the present invention will protect a load only as long as operation is maintained on curve 54 of FIG. 2. In other words, operation must not be allowed to pass point 84 of FIG. 2, which is represented as the terminus of a dashed line in FIG. 3. Accordingly, it is useful to set a time delay to operate a crowbar within a time that is less than the length of time interval 86, the time from point 60 to point 84. This is facilitated by the fact that the flux change in core 46 is associated with the rise in transformer voltage curve 78 after point 60 and this flux change is available to trigger the time-delay circuit 30 of FIG. 1. The length of time interval 86 is directly proportional to the total change in flux linkages in the primary winding and inversely proportional to the voltage of the power supply. If the circuit quenches automatically as illustrated in FIG. 3, then the portion of FIG. 2 between points 62 and 80 will generate in signal winding 28 an impulse that can be used to reset the crowbar time delay and prevent the operation of crowbar 24 of FIG. 1. If the arc does not quench automatically before the predetermined time of the time-delay circuit, then crowbar 24 will be triggered to short the power supply and protect the load. The design of crowbar time-delay circuit 30 is a routine matter of using counters or flip-flops to time the desired waiting period before triggering the crowbar 24.

FIG. 4 is a circuit diagram of an alternate embodiment of the present invention. FIG. 4 is similar to FIG. 1 in that a load 10 is connected through a transformer 12 to a high-voltage power supply 14. A crowbar 24 is connected across the terminals of high-voltage power supply 14 to protect load 10 from the effects of damaging overvoltages. Transformer 12 includes a primary winding 11, a signal winding 28 and a bias winding 32. As with FIG. 1, bias winding 32 is connected to bias supply 34 through a series-parallel combination of resistor 36, capacitor 40 and inductor 42 to filter pulses in bias winding 32 to protect bias supply 34. In the embodiment of FIG. 4, signal winding 28 serves two functions. The first, as in FIG. 1, is to trigger crowbar 24, either directly or as shown in FIG. 4 through a time-delay circuit 30. The other function of signal winding 28 is to sense an overload in the same way that was explained with reference to the circuit of FIG. 1 and to initiate a further protective response for load 10. This is accomplished by connecting a triggered high-voltage spark gap 90 in series with a capacitor 91 across load 10. Capacitor 91 is charged through resistor 92 by power supply 93 to a d-c voltage that is low in comparison with the normal operating voltage across load 10. Trigger electrode 94 is disposed in spark gap 90 to initiate conduction across spark gap 90 in response to a signal from signal winding 28. When this happens, the energy stored in capacitor 91 will discharge and drive current through the fault in load 10 in a direction opposite to the flow of fault current. By this means, the net current in load 10 goes through zero and the arc is quenched. Normal operation of the circuit of FIG. 4 comprises quenching the arc by means of the triggered spark gap 90 and the quenching energy from capacitor 91. However, if the arc is not quenched or if the arc restrikes before the circuit of FIG. 4 has been restored to steady-state conditions, then the signal from time-delay trigger circuit 30 will cause crowbar 24 to operate and short out power supply 14 before time interval 86 has elapsed, thus protecting the load against damage.

The nature of load 10 in FIGS. 1 and 4 has been described herein as a high-voltage load. While the present invention has particular utility in application to structures such as accelerating tubes, Cockroft-Walton generators, and other structure designed to support high voltages, its use is not limited to such structures. The saturating time-delay transformer 12 of FIGS. 1 and 4 can equally as well be used to protect loads at lower voltages, of the order of hundreds of volts or less. This extends the choice of elements to be used for crowbar 24 which includes ignitrons, thyratrons, SCR's, transistors, vacuum tubes, and any of a number of other elements meeting the requirement that they sustain the operating voltage of power supply 14 with very little current unless triggered, in which case they must sustain the short circuit current of power supply 14. Transformer 12 has a primary winding that must be capable of carrying the load current in load 10 and must be capable of supporting the load voltage of power supply 14. The bias winding 32 and signal winding 28 can be designed for relatively low voltage. Signal winding 28 is primarily a pulse winding and must be designed to provide adequate response to pulses induced by rapid change in the flux in core 46 of FIGS. 1 and 4. Other requirements of the circuits of FIGS. 1 and 4 are design choices depending on the parameters of the source and load. For example, one such design choice allows the designer to combine the functions of the bias winding and the signal winding into a single winding. In this case, the signal used to trigger the crowbar and, if used, the spark gap is obtained by connecting across the terminals of the bias winding before the filter network. This is an obvious possibility, although not a likely choice because of the typical parameters to be expected in such a circuit.

The following example will make this clear. Consider the problem of protecting with a time delay of 50 microseconds a load designed to carry 10 amperes at 200 kilovolts. Suppose there is available a core in which the saturation level of flux density is 17 kiloGauss, and assume a primary winding comprising 100 turns. The core area would then be 294 square centimeters, obtained as follows. The change of flux density is from saturation in one direction to saturation in the other so that the net change is 2 × 17 kiloGauss = 34 kiloGauss and this change takes place in at most 50 microseconds. From Faraday's Law, the cross-sectional area of the core is thus the ratio of the product of voltage and time to the product of turns and change in flux density. Substitution of the values above gives 294 square centimeters or a square cross section approximately 17.2 cm on a side. During normal operation, the magnetomotive force (mmf) of the load current is 100 turns × 10 amperes = 1000 ampere-turns. This value of mmf represents the distance between points 50 and 58 in FIG. 2. The value of mmf supplied by the bias winding must equal this amount plus an additional amount sufficient to move the core to point 58. A routine calculation of the amount of core necessary to provide a cross section of 17.2 square centimeters and enough core window to support a primary of 100 turns insulated for 200 kilovolts results in a median core length of approximately 160 cm. A typical value of the magnetic field strength at saturation is 2 amperes/cm. The product of this magnetic field strength and the mean length shows that 320 ampere turns are necessary to put the core into saturation at point 58. Thus, the bias winding must produce the sum of 1000 and 320 ampere turns or 1320 ampere turns. A two-turn coil will produce this with a current of 660 amperes. With this current flowing in the bias winding, the core would be placed in operation at point 58 of FIG. 2. Slight variations in this value of current enable the motion of point 58 to the left or right to make a ready adjustment of the sensitivity of triggering. It will be remembered that triggering takes place only when the current through the primary is increased sufficiently to move the primary ampere turns from point 58 to and past point 60. It should also be evident that the voltage ratings necessary for both the primary and bias coils are evident from this design approximation. Thus each primary turn must be insulated from the next by an amount sufficient to withstand the ratio 200 kilovolts/100 turns or 2 kilovolts per turn. The bias winding will be subjected to a step down of 100:2 on 200 kilovolts, or a voltage of 4 kilovolts.

The foregoing calculations make it evident that in situations where 4 kv is too high a voltage for the crowbar trigger circuit, it will be easier to use separate windings for the bias winding and the signal winding. However, this is a matter of design convenience rather than necessity, as the signal sufficient to trigger a crowbar is available at the terminals of the bias winding and could be so used. It should also be evident that the indicated use of more than one ignitron as a crowbar is a matter as well of design requirements. If the voltage rating capacity of the power supply exceeds that of the ignitrons readily available, then it is a simple matter to place additional ignitrons in series to support the load voltage or in parallel to carry the load current. In such a case, it is an equally simple matter to add other signal windings to the transformer to control these ignitrons if they are to be controlled directly. In the alternative, one signal winding can be connected to a single time-delay circuit which can then be used to trigger a plurality of ignitrons via separate trigger circuits.

The embodiments of the invention in which an exclusive property or privilege is claimed are defined as follows:

1. An apparatus for protecting an electrical load connected to a d-c supply from damage from overcurrent in case of a load fault comprising:
  a. a transformer having a primary winding, a secondary winding, and a ferromagnetic core capable of maintaining inductive coupling between the primary winding and the secondary winding, the primary carrying the load current and the ferromagnetic core in magnetic saturation from magnetic flux set up in the ferromagnetic core by the load current;
  b. a bias supply connected electrically to the secondary winding and supplying a current to the secondary winding in a direction to saturate the ferromagnetic core, the current in the secondary winding producing an mmf greater in magnitude and opposite in direction to the mmf produced by the load current, the net mmf placing the saturation of the core at a value near the knee of the B-H curve and in saturation;
  c. a filter connected between the bias supply and the secondary winding to isolate the bias supply from pulses generated in the secondary winding by changes in load current through the primary winding;
  d. a crowbar connected across the d-c supply; and
  e. a time-delay circuit connected to the crowbar and to the transformer and responsive to changes in the transformer that indicate a fault to apply a delayed triggering signal to the crowbar after a predetermined time interval, thereby making the crowbar a short circuit and protecting the load.

2. The apparatus of claim 1 wherein the time-delay circuit is resettable to prevent the triggering of the crowbar upon receipt of a signal indicating that the fault has been cleared during the time interval to which the time-delay circuit is set.

3. The apparatus of claim 2 wherein the time-delay circuit is connectd to the secondary winding of the transformer.

4. The apparatus of claim 1 comprising in addition a signal winding of the transformer coupled inductively through the ferromagnetic core to the primary winding and the secondary winding, the signal winding further coupled to the time-delay circuit to initiate a time-delayed triggering of the crowbar.

5. The apparatus of claim 4 comprising in addition:
   a. a triggered spark gap having two gap electrodes and a trigger electrode;
   b. a capacitor connected to one of the two gap electrodes and to one side of the load, the other of the gap electrodes connected to the other side of the load to form a closed circuit of the first gap, the second gap, the capacitor and the load, the triggering electrode of the triggered spark gap connected to the transformer and responsive to a signal therefrom to trigger the triggered gap into conduction; and
   c. a power supply connected across the capacitor to charge the capacitor to a voltage that is opposite in sense to the load voltage, whereby a current flows through the load in opposition to the load current when the gap is triggered into conduction.

6. The apparatus of claim 1 wherein the crowbar is an ignitron.

7. The apparatus of claim 1 wherein the crowbar is a silicon-controlled rectifier.

8. The apparatus of claim 1 wherein the crowbar is a spark gap.

9. An apparatus for protecting from damage by overcurrent an electrical load that is supplied with a load voltage by a d-c supply, the apparatus comprising:

a transformer having a primary winding, a bias winding, and a signal winding, the windings all coupled inductively to each other by a ferromagnetic core, the primary winding connected in series with the d-c supply and the load to form a series circuit, The core in magnetic saturation when carrying a load current in a normal amount;

an ignitron connected across the d-c supply, the ignitron having an ignitor electrode to trigger conduction;

a time-delay circuit connected to the signal winding and the ignitor electrode and responsive to a signal from the signal winding to effect a time-delayed triggering of conduction of the ignitron;

a bias supply connected through a filter to establish a bias current in the bias winding in a sense to saturate the core in opposition to the normal load current and to leave the core in saturation near the knee of the B-H curve;

a triggered spark gap having a first electrode, a second electrode, and a triggering electrode, the first electrode connected to a first terminal of the electrical load, the triggering electrode connected to the signal winding to initiate conduction from first electrode to the second electrode in response to a signal from the signal winding;

a capacitor connected to the second electrode and to a second terminal of the electrical load to form with the electrical load, the first electrode, and the second electrode a simple series circuit; and a d-c power supply connected in parallel with the capacitor to charge the capacitor to a voltage that is opposite in sense to the load voltage and smaller in magnitude than the load voltage.

* * * * *